United States Patent [19]
Ellsworth

[11] Patent Number: 5,226,576
[45] Date of Patent: Jul. 13, 1993

[54] VEHICLE TRASH CONTAINER

[76] Inventor: Brian G. Ellsworth, 1415-½ Fort St., Boise, Id. 83702

[21] Appl. No.: 789,742
[22] Filed: Nov. 8, 1991
[51] Int. Cl.⁵ ................................................ B60R 7/00
[52] U.S. Cl. .............................. 224/42.46 R; 224/275; 383/22; 383/111; 383/120
[58] Field of Search ................. 224/42.46 B, 42.46 R, 224/275, 282; 297/191; 383/116, 111, 120, 7, 22, 24, 23; 229/123

[56] References Cited
U.S. PATENT DOCUMENTS

| | | | |
|---|---|---|---|
| 1,527,056 | 2/1925 | Martin | 224/42.46 B |
| 2,830,748 | 4/1958 | Faltin | 224/42.46 R |
| 2,925,172 | 2/1960 | Hopp | 383/23 |
| 3,608,712 | 9/1971 | Savoie | 270/404 |
| 3,632,029 | 1/1972 | Sonner | 383/22 |
| 3,690,446 | 9/1972 | Spainhour et al. | 224/275 |
| 5,046,433 | 9/1991 | Kramer et al. | 297/191 |

FOREIGN PATENT DOCUMENTS 859428 10/1952 Fed. Rep. of Germany ...... 383/120

Primary Examiner—Linda J. Sholl
Attorney, Agent, or Firm—Frank J. Dykas; Craig M. Korfanta; Ken J. Pedersen

[57] ABSTRACT

The invention is a waste receptacle with an outer container having foldable sidewalls, a rectangular bottom and an inner means for supporting and securing a disposable bag liner. The liner is preferably a recycled plastic grocery bag.

8 Claims, 7 Drawing Sheets

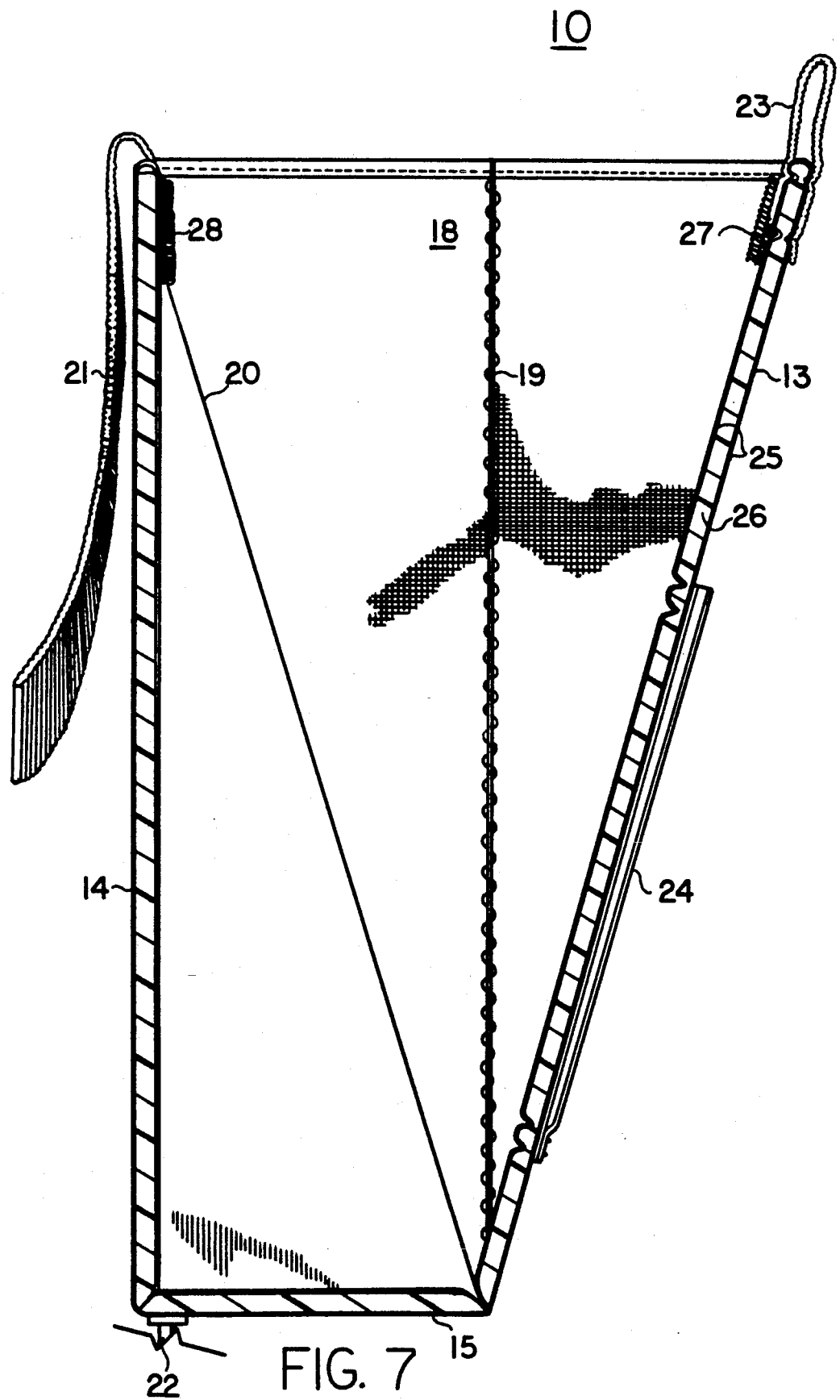

VEHICLE TRASH CONTAINER

BACKGROUND OF THE INVENTION

1. Technical Field

This invention relates generally to waste receptacles, and more particularly to portable waste receptacles for use in vehicle passenger compartments. Specifically, the invention is an outer container of special geometry and construction, and an inner disposable bag.

2. Background Art

U.S. Pat. No. 3,608,712 (Savoie) discloses a waste receptacle with an outer container having foldable sidewalls, a v-shaped bottom in cross-section, and an inner array of disposable bags. However, this receptacle, due to its v-shaped design, has small capacity, and is difficult to close when full. Also, due to its special inner array of disposable bags, it requires specially-manufactured and expensive bag liners.

U.S. Pat. No. 3,675,810 (Ross, et al.) discloses a waste receptacle comprising an outer holder, an inner disposable container, a removable protective liner and an apertured cover.

U.S. Pat. No. 3,690,446 (Spainhour, et al.) discloses a waste receptacle comprising a folding housing and an internal structure defining an inner cavity containing alternating horizontal zones of reduced and expanded width.

U.S. Pat. No. 3,692,072 (Kohls) discloses a waste receptacle surrounded by a generally oval inclined ring supporting a net for funneling litter into a basket below the net.

U.S. Pat. No. 3,951,446 (Zehnder, et al.) discloses a waste receptacle built into the trunk compartment of a car, the receptacle being accessible through a trap door behind the rear seat.

However, there remains a need in the vehicle accessory industry for a portable waste receptacle with large capacity that closes when full, and which uses recycled bag liners.

DISCLOSURE OF INVENTION

What I have invented is:

A waste receptacle comprising:
- an outer container having front and back walls, foldable sidewalls, and a generally rectangularly shaped bottom; and
- an inner means for supporting and securing a disposable bag liner inside said outer container.

My invention also includes the waste receptacle above wherein:
- the angle between the back wall and the bottom is between about 80°-86°;
- the sidewalls have a pleat with a seam stitched towards the inside of said outer container towards the front wall of the container, and a seam stitched towards the outside of said outer container towards the back wall of the container;
- the container has attachment means for securing it to the back of a vehicle seat;
- the container has closure means for securing it in a closed position;
- the container has storage means for storing extra bag liners;
- the inner means for supporting and securing the bag liner is a set of four (4) hooks at the top inside corners of the front and back walls;
- the container material for the front and back walls and bottom is a three-layer composite of a foam pad between two (2) fabric layers; and,
- the container material for the front and back walls and bottom is a two-layer composite of a foam pad on one (1) fabric layer.

BRIEF DESCRIPTION OF DRAWING

FIG. 7 is an elevational, cross-sectional view of my receptacle along the line 7—7 in FIG. 2.

DESCRIPTION OF THE PREFERRED EMBODIMENTS

Figure 1:
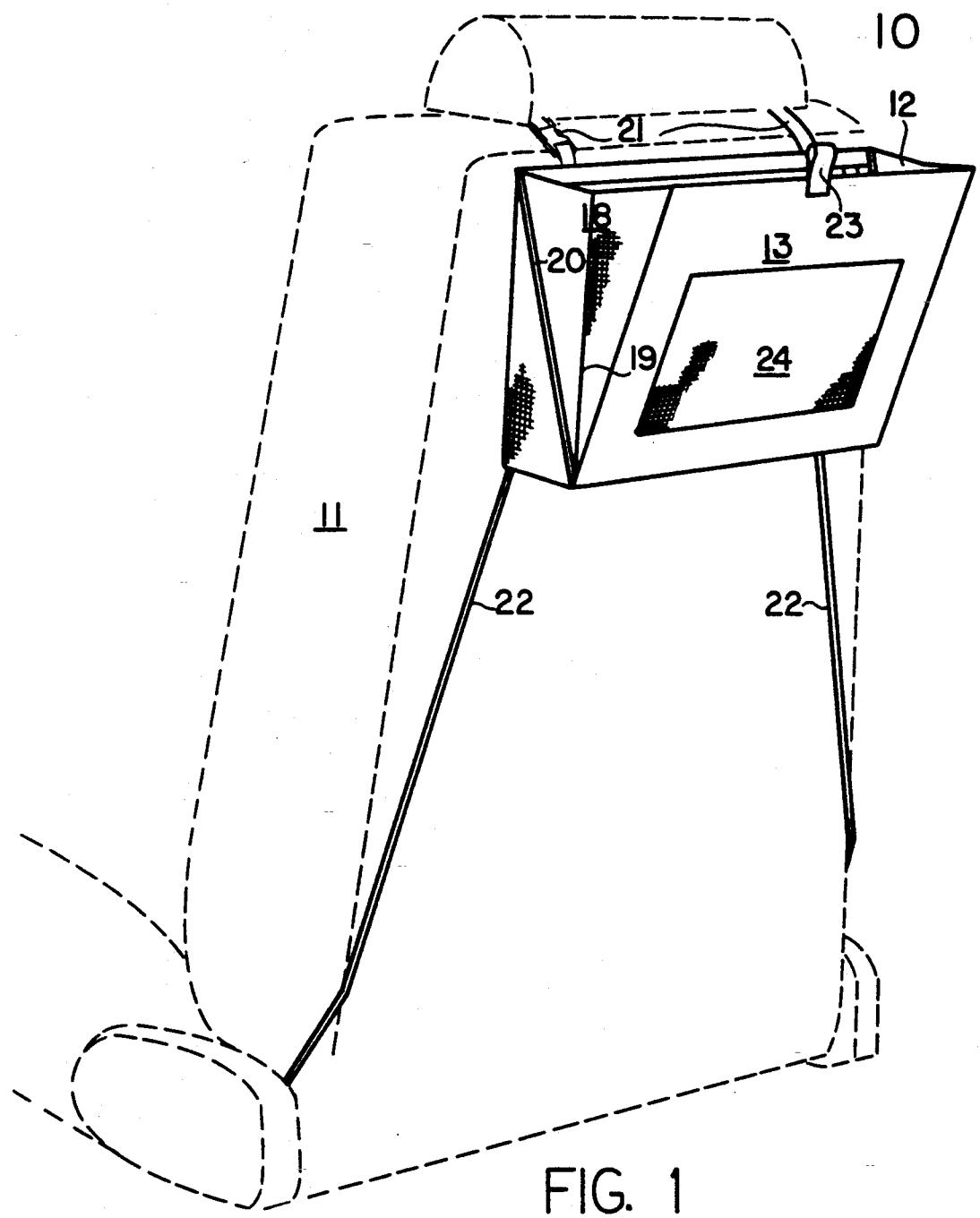
FIG. 1 is a perspective view of the receptacle of my invention attached to the back of a vehicle seat.
Figure 2:
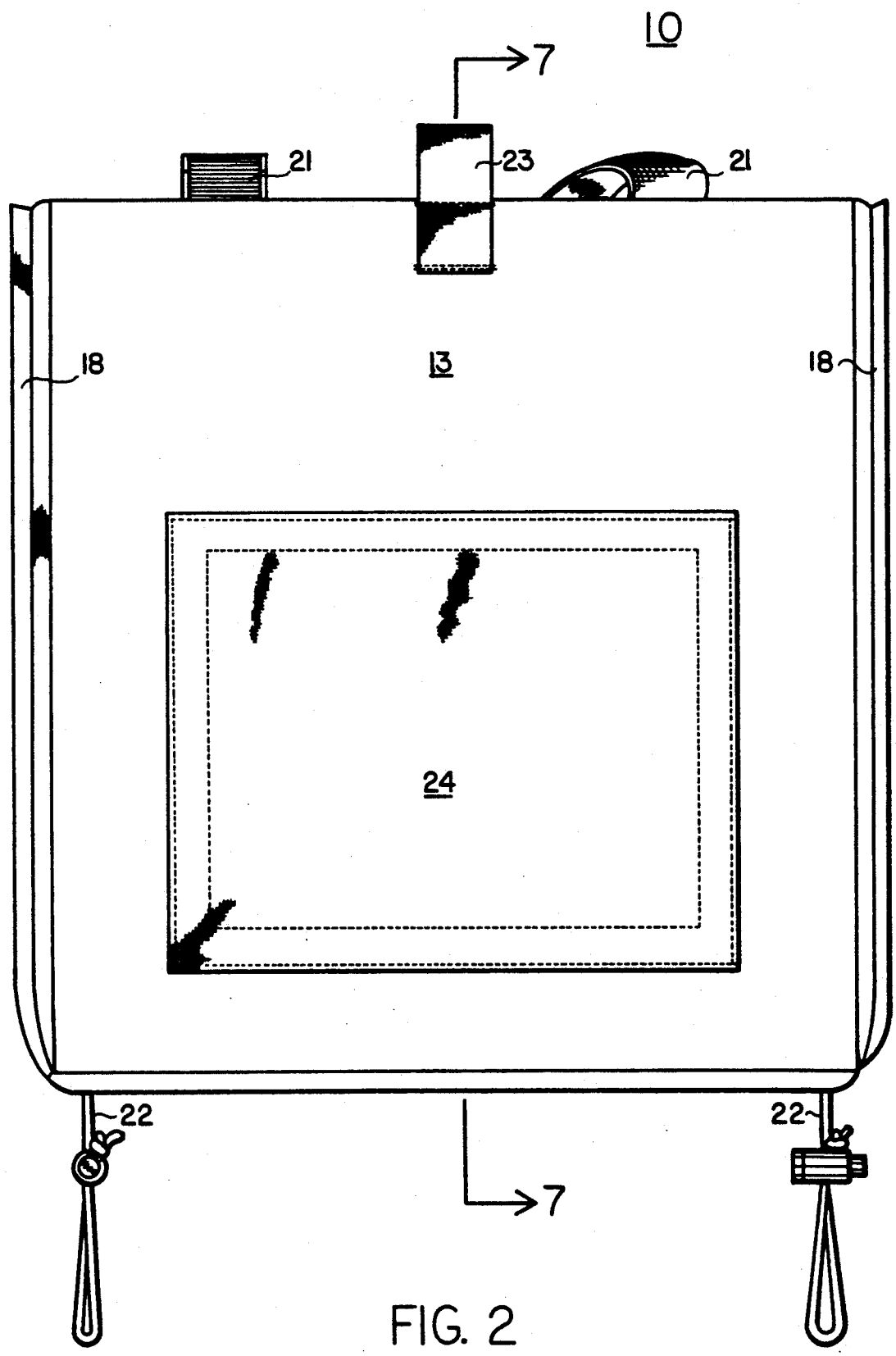
FIG. 2 is an elevational view of the front of my receptacle.
Figure 3:
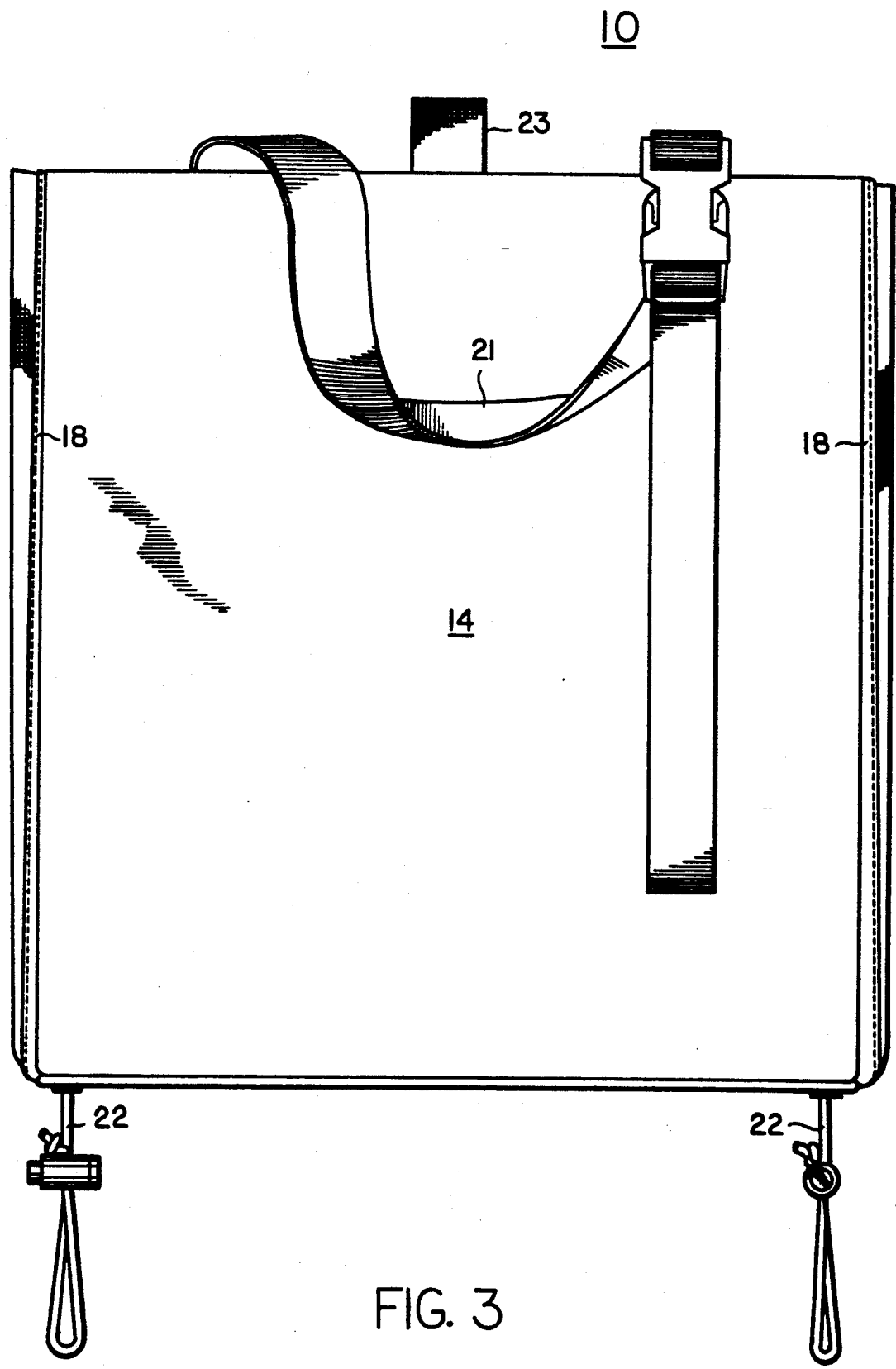
FIG. 3 is an elevational view of the back of my receptacle.

Referring to the drawings, there is depicted generally my receptacle 10 attached to the back of vehicle passenger seat 11. Receptacle 10 has outer container 12 with front wall 13, back wall 14, and generally rectangularly shaped bottom 15. Receptacle 10 has inner means 16 for securing and supporting disposable bag liner 17 inside of outer container 12.

My receptacle uses gravity to open easily, due to its special foldable sidewalls. Also, the receptacle's rectangular bottom design creates a container with large capacity which may be closed even when it is ⅞ full of trash.

Figure 4:
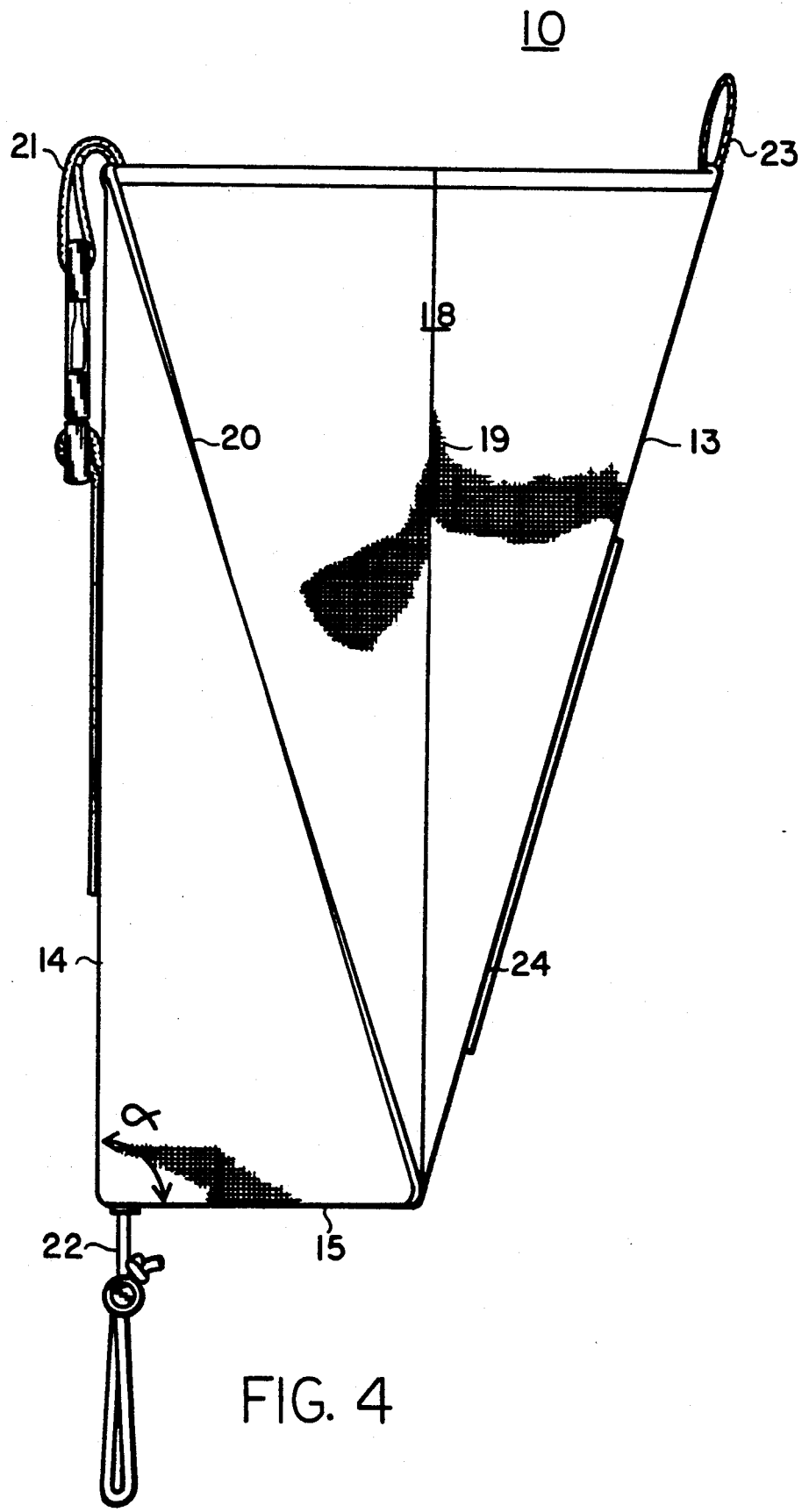
FIG. 4 is an elevational view of the side of my receptacle.

Preferably, the angle (alpha) in FIG. 4 between the back wall 14 and the bottom 15 is between about 80 and 86°. This way, the customary tilt of the car seat of 3°-5° from 90° is taken into account, and the bottom 15 of the receptacle remains generally horizontal, rather than tipping down towards the front wall 13. However, the top opening of container 12 still has a slight incline down toward front wall 13 when it is in the open position, making the inside of the receptacle more accessible to the user.

Preferably, the receptacle 10 has two (2) pleated sidewalls 18. Pleat 19, which is more towards the front wall 13 of the container, extends up from near front wall 13 near bottom 15 to a point near the midpoint of sidewall 18 at its top. Pleat 19 had a seam folded towards the inside of the container and stitched. Pleat 20, which is more towards the back wall 14 of the container, extends up from near front wall 13 near bottom 15 to a point near the back wall 14 at the top of sidewall 18. Pleat 20 has a seam folded towards the outside of the container and stitched. This way, sidewalls 18 fold in on themselves when the container is in the closed position, making the receptacle neat and attractive in this position.

Preferably, receptacle 10 has outer attachment means 21 and 22 for securing it to the back of a vehicle seat. Means 21 is an adjustable strap with a snap-fit buckle which may be looped snugly around the seat headrest. Means 22 are adjustable cords extending out from the back bottom corners which may be tied or hooked to the undercarriage of the seat.

Figure 5:
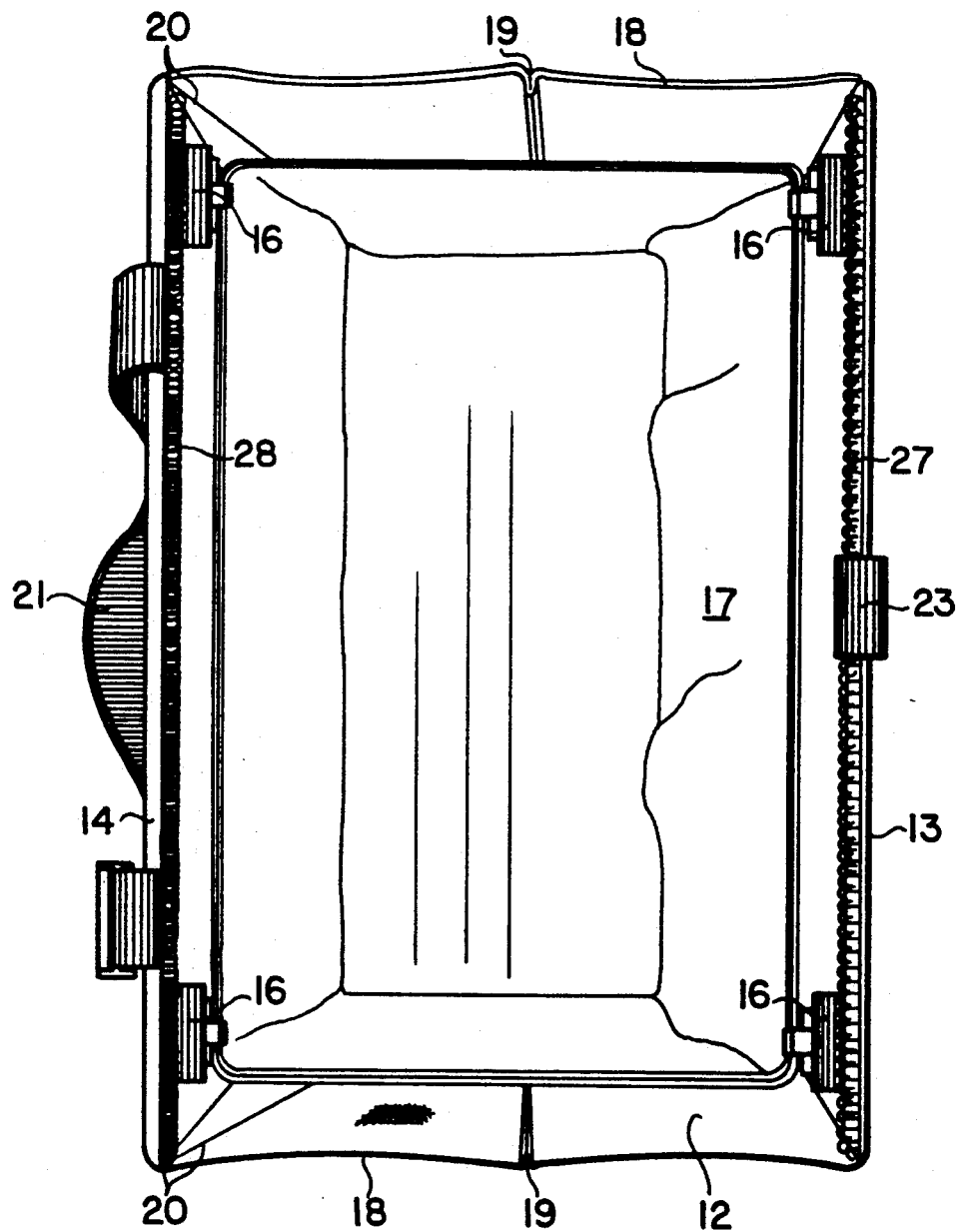
FIG. 5 is a plan view of the top of my receptacle.
Figure 6:
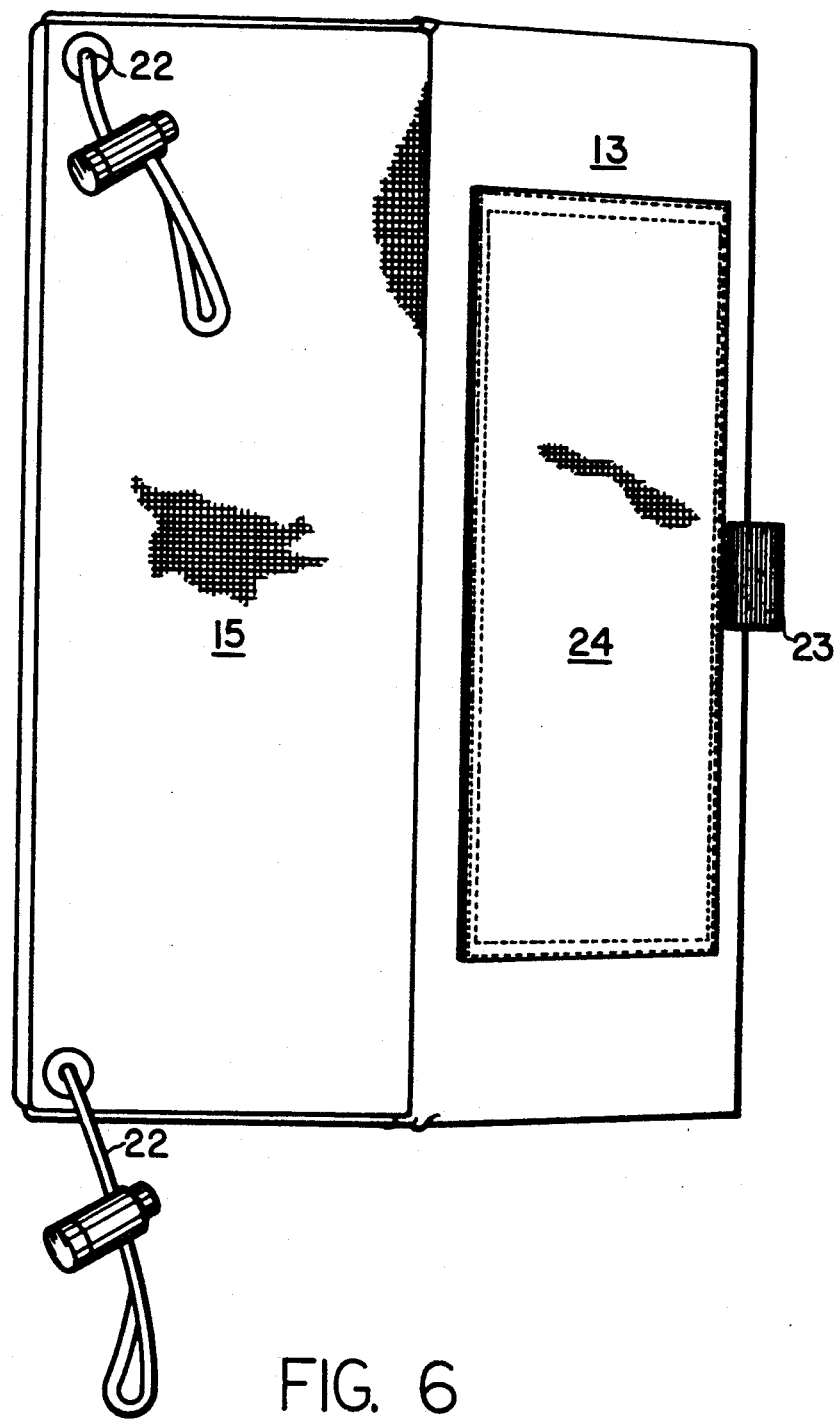
FIG. 6 is a plan view of the bottom of my receptacle.

Preferably, receptacle 10 has closure means 23 for securing it in a closed position. In FIG. 5, closure means 23 is a tab sewn over a strip of Velcro ® sewn along the top inside edge 10 of front wall 13 and back wall 14, the loop section being shown at 27 and the hook section being shown at 28.

Preferably, receptacle 10 has outer storage means 24 attached to the front wall 13. Storage means 24 is a rectangular patch of fabric sewn on its two sides and bottom to front wall 13. At its top, there may be sewn a strip of Velcro ® to operate with another strip sewn onto front wall 13. This way, extra bag liners 17 may be stored in storage means 24.

Preferably, receptacle 10 has a set of four (4) hooks 16 at the top inside corners of the front 13 and back 14 walls. The hooks are snap hooks like the type used on ski gloves. The hooks on the inside of the front wall 13 are sewn close to the top in the corner. The hooks on the inside of the back wall 14 are sewn about one (1) inch down from the top so that the top of the liner 17 is nearly level when the container is in the open position. This way, trash is less likely to spill from the bag.

Outer container 12 and hooks 16 are designed with dimensions to cooperate with the same dimensions of readily available plastic grocery bags. The bags, then, may be recycled as liners 17 by hanging their handles from hooks 16. This eliminates the need to purchase bags as liners. Also, this creates a recycling use for these plastic grocery bags, helping to minimize waste.

The material for outer container 12 is preferably a nylon or other synthetic material. For my top-of-the-line model, I prefer 420 D nylon. For my lesser model, I prefer 210 D nylon. Preferably, the front 13 and back 14 walls are composite materials. For my top model, I prefer a three-layer composite of a foam pad between two (2) fabric layers. For my lesser model, I prefer a 2-layer composite of a foam pad on one (1) fabric layer. Preferably, the foam is ¼ inch thick Korean Artillion ® closed-cell foam. The foam is rigid enough to give the container structural integrity, but soft enough so that the container will bend and fold if a passenger hits the bag in the event of a crash. Both the fabric and the foam are machine washable. The sidewalls 18 may be made from fabric only—they need not contain any foam.

The container 12 may be made by any conventional technique. Generally, I have made my models by cutting pieces of fabric, with and without foam, and sewing them together at geometric intersections. However, especially for my lesser models, I can foresee the front wall, bottom and back wall panels being formed from 1 piece, and being heat-creased, for example, at the geometric intersections to give the container its required shape. Also, I can foresee the sewn attachments described above being made by gluing or heat welding.

While there is shown and described the present preferred embodiment of the invention, it is to be distinctly understood that this invention is not limited thereto but may be variously embodied to practice within the scope of the following claims.

What I claim is:

1. A waste receptacle comprising:
   an outer container having front and back walls, foldable sidewalls and generally rectangular shaped bottom; and
   an inner support means for supporting and securing a disposable bag liner inside said outer container;
   wherein the said sidewalls have a first pleat with a seam folded towards the inside of said container and stitched, and a second pleat with a seam folded towards the outside of said container and stitched;
   the first pleat extending up from an intersection point of said front wall and said bottom to a first point at a top of said sidewalls and located between the tops of said front and back walls and the second pleat extending up from said intersection point to a second point on the back wall at the top of said sidewalls.

2. The waste receptacle of claim 1 wherein the angle between the back wall and the bottom is between about 80°–86°.

3. The waste receptacle of claim 1 wherein the container has attachment means for securing it to the back of a vehicle seat.

4. The waste receptacle of claim 1 wherein the container has closure means for securing it in a closed position.

5. The waste receptacle of claim 1 wherein the container has storage means for storing extra bag liners.

6. The waste receptacle of claim 1 wherein the inner means for supporting and securing the bag liner is a set of four (4) hooks at the top inside corners of the front and back walls.

7. The waste receptacle of claim 1 wherein the container material for the front and back walls and bottom is a three-layer composite of a foam pad between two (2) fabric layers.

8. The waste receptacle of claim 1 wherein the container material for the front and back walls and bottom is a two-layer composite of a foam pad on one (1) fabric layer.

* * * * *